US011766647B2

United States Patent
Son et al.

(10) Patent No.: US 11,766,647 B2
(45) Date of Patent: Sep. 26, 2023

(54) BLENDER HAVING BI-DIRECTIONALLY ROTATABLE BLADES

(71) Applicant: Cuckoo Electronics Co., Ltd., Yangsan-si (KR)

(72) Inventors: Jung Chul Son, Yangsan-si (KR); Chul Soo Park, Siheung-si (KR); Youl Young Ju, Siheung-si (KR)

(73) Assignee: CUCKOO ELECTRONICS CO., LTD., Yangsan-si (KR)

( * ) Notice: Subject to any disclaimer, the term of this patent is extended or adjusted under 35 U.S.C. 154(b) by 331 days.

(21) Appl. No.: 17/191,025

(22) Filed: Mar. 3, 2021

(65) Prior Publication Data
US 2021/0316259 A1    Oct. 14, 2021

(30) Foreign Application Priority Data
Apr. 8, 2020    (KR) .................. 10-2020-0043015

(51) Int. Cl.
*B01F 35/32*    (2022.01)
*B01F 27/808*    (2022.01)
(Continued)

(52) U.S. Cl.
CPC ........ *B01F 35/3204* (2022.01); *B01F 27/808* (2022.01); *B01F 35/31* (2022.01);
(Continued)

(58) Field of Classification Search
CPC .. B01F 35/31; B01F 35/3204; B01F 35/3213; B01F 27/808; B01F 27/703;
(Continued)

(56) References Cited

U.S. PATENT DOCUMENTS 2,807,447 A * 9/1957 Vaughan ............... A47J 43/046
366/314
4,071,789 A * 1/1978 Ernster ................. A47J 43/087
310/83
(Continued)

FOREIGN PATENT DOCUMENTS

CN     203041970 U     7/2013
CN     108991949 A     12/2018
(Continued)

*Primary Examiner* — Walter D. Griffin
*Assistant Examiner* — Patrick M McCarty
(74) *Attorney, Agent, or Firm* — STIP Law Group, LLC

(57) ABSTRACT

A blender includes a blade assembly including a main blade shaft that is coupled to a first blade and a first main coupler so as to rotate in a forward direction and a reverse-rotation blade shaft that is coupled to a second blade and a first reverse-rotation coupler so as to rotate in a reverse direction, a gearbox assembly including a main gear shaft coupled to a second main coupler, which is engaged with the first main coupler, so as to rotate in the forward direction, a plurality of gears configured to convert the forward rotation of the main gear shaft to reverse rotation, and a second reverse-rotation coupler configured to transmit the reverse rotation transmitted through the plurality of gears to the first reverse-rotation coupler, and a case that has the gearbox assembly provided therein.

17 Claims, 11 Drawing Sheets

(51) Int. Cl.
  *B01F 35/31* (2022.01)
  *B01F 35/33* (2022.01)
  *B01F 35/30* (2022.01)
  *B01F 101/00* (2022.01)

(52) U.S. Cl.
  CPC ......... *B01F 35/3213* (2022.01); *B01F 35/332* (2022.01); *B01F 2035/351* (2022.01); *B01F 2035/352* (2022.01); *B01F 2101/1805* (2022.01)

(58) Field of Classification Search
  CPC .... B01F 27/704; B01F 27/705; B01F 27/706; B01F 27/708; A47J 43/046
  See application file for complete search history.

(56) References Cited

U.S. PATENT DOCUMENTS

| | | | | |
|---|---|---|---|---|
| 6,012,837 | A  * | 1/2000 | Thuma | B01F 27/13 |
| | | | | 99/348 |
| 6,325,378 | B1 * | 12/2001 | Okumachi | F16J 15/342 |
| | | | | 277/408 |
| 2009/0193982 | A1 * | 8/2009 | Chou | A47J 43/0722 |
| | | | | 99/510 |
| 2012/0071293 | A1 * | 3/2012 | Cheung | A47J 43/085 |
| | | | | 475/331 |
| 2012/0314533 | A1 * | 12/2012 | Wang | B01F 27/1123 |
| | | | | 366/292 |
| 2014/0299687 | A1 * | 10/2014 | Rosenzweig | A47J 43/085 |
| | | | | 366/244 |
| 2015/0265987 | A1 * | 9/2015 | Kidd | H02K 7/11 |
| | | | | 366/206 |
| 2016/0249772 | A1 * | 9/2016 | Jays | B01F 35/3204 |
| | | | | 366/294 |
| 2017/0354940 | A1 * | 12/2017 | Kolar | B01F 27/808 |
| 2018/0056254 | A1 * | 3/2018 | Liu | B01F 35/3204 |
| 2018/0128326 | A1 * | 5/2018 | Lin | A47J 43/085 |
| 2019/0045976 | A1 * | 2/2019 | Ouyang | A23N 1/02 |
| 2022/0039601 | A1 * | 2/2022 | Kim | A47J 43/085 |

FOREIGN PATENT DOCUMENTS

| | | | |
|---|---|---|---|
| CN | 110529581 A | * | 12/2019 |
| KR | 200196399 Y1 | | 9/2000 |
| KR | 101862587 B1 | | 5/2018 |
| KR | 102022492 B1 | * | 9/2019 |

* cited by examiner

# BLENDER HAVING BI-DIRECTIONALLY ROTATABLE BLADES

CROSS-REFERENCE TO RELATED APPLICATIONS

This application claims the priority of the Korean Patent Applications NO. 10-2020-0043015 filed on Apr. 8, 2020, in the Korean Intellectual Property Office, the disclosure of which is incorporated herein by reference.

TECHNICAL FIELD

The present disclosure relates to a blender having bi-directionally rotatable blades, and more particularly, to a blender having bi-directionally rotatable blades that allows a blade assembly to be easily separated from a container and allows the blade assembly to be separated from a gearbox assembly upon separation of the container from a case.

BACKGROUND ART

Generally, a blender is an electric device that processes foods such as fruits, vegetables, and grains by mincing, juicing, mixing, cutting, or grinding the foods to allow the foods to be consumed in various forms.

The blender includes a motor, blades which receive a rotational force of the motor to rotate, and a container in which the blades are disposed. In this case, since, when the blades rotate only in one direction, the load on the motor increases, a known blender having bi-directionally rotatable blades has a single motor that rotates two blades in opposite directions.

As the related art relating to the blender having bi-directionally rotatable blades, Korean Utility Model Registration No. 20-0196399 (Title of Invention: "Grinder-mixer") has been disclosed.

The mixer of the related art includes a pair of blades that rotate in opposite directions and a gear part configured to transmit power of a motor to simultaneously rotate the pair of blades.

According to such a structure, since it is not easy to disassemble the blades from a container and the blades remain coupled to the gear part, when a user wants to wash the container, the user has to hold the entire container coupled to the gear part to wash the container, and thus there is a problem in that the user has to hold a heavy object. Also, since it is difficult to disassemble the blades from the container, there is a problem in that, when the user washes the container without removing the blades, the user may get injured.

DISCLOSURE

Technical Problem

The present disclosure is directed to providing a blender having bi-directionally rotatable blades that facilitates the disassembly and assembly of components, allows a user to safely use the blender, and improves the durability of the components.

Technical Solution

One aspect of the present disclosure provides a blender having bi-directionally rotatable blades, the blender including a container configured to accommodate food, a blade assembly including a main blade shaft that has an upper portion coupled to a first blade and a lower portion coupled to a first main coupler so as to rotate in a forward direction and a reverse-rotation blade shaft that has an upper portion coupled to a second blade and a lower portion coupled to a first reverse-rotation coupler so as to rotate in a reverse direction and that has a structure which is coaxial with the main blade shaft and through which the main blade shaft passes, a gearbox assembly including a main gear shaft coupled to a second main coupler, which is engaged with the first main coupler, so as to rotate in the forward direction, a plurality of gears configured to convert the forward rotation of the main gear shaft to reverse rotation, a second reverse-rotation coupler configured to transmit the reverse rotation transmitted through the plurality of gears to the first reverse-rotation coupler, and a gearbox housing configured to surround outer sides of the main gear shaft, the plurality of gears, and the second reverse-rotation coupler, and a case that has the gearbox assembly provided therein and a case upper plate formed to cover an upper portion of the gearbox assembly, the case upper plate being formed so that the second main coupler and the second reverse-rotation coupler pass therethrough.

Advantageous Effects

According to the present disclosure, since a blade assembly can be easily separated from a container, it is possible to prevent a user from getting injured when washing the container.

Also, since the blade assembly and a gearbox assembly are simultaneously separated when the container is separated from a case, the container is lightweight, and thus it is possible to prevent inconvenience to the user due to the weight of the container.

Also, since a shaft and a plurality of gears that transmit rotation of a motor are provided inside a gearbox housing, and the gearbox housing is provided inside the case, components that generate operational noise are doubly-surrounded by the gearbox housing and the case, and thus the operational noise can be minimized.

Also, since couplers that transmit forward rotation and reverse rotation between the blade assembly and the gearbox assembly are provided in a recessed portion, which is a space between the container and the case, and the couplers are coupled so as to be easily separable, when a failure of the couplers occurs and repairs are required, the couplers can be easily replaced, and thus the repair work can be facilitated.

Also, since an inner flange that protrudes upward along a circumference of a through-hole through which a second reverse-rotation coupler is inserted into a case upper plate and a reverse-rotation coupler edge that overlaps the inner flange first block the flow of moisture into the gearbox assembly, and an oil seal interposed at each of an inner side and an outer side of a reverse-rotation gear connection shaft secondarily blocks the flow of moisture into the gearbox assembly, the durability of the components provided in the gearbox assembly can be improved.

In addition, since two sub-gears are provided to transmit the reverse rotation to a second blade, and the two sub-gears each consist of a double gear to have different gear ratios, it is possible to set a rotational speed of a first blade and the second blade to various speeds.

MODES OF THE INVENTION

Hereinafter, the present disclosure will be described in detail with reference to the accompanying drawings.

Figure 1:
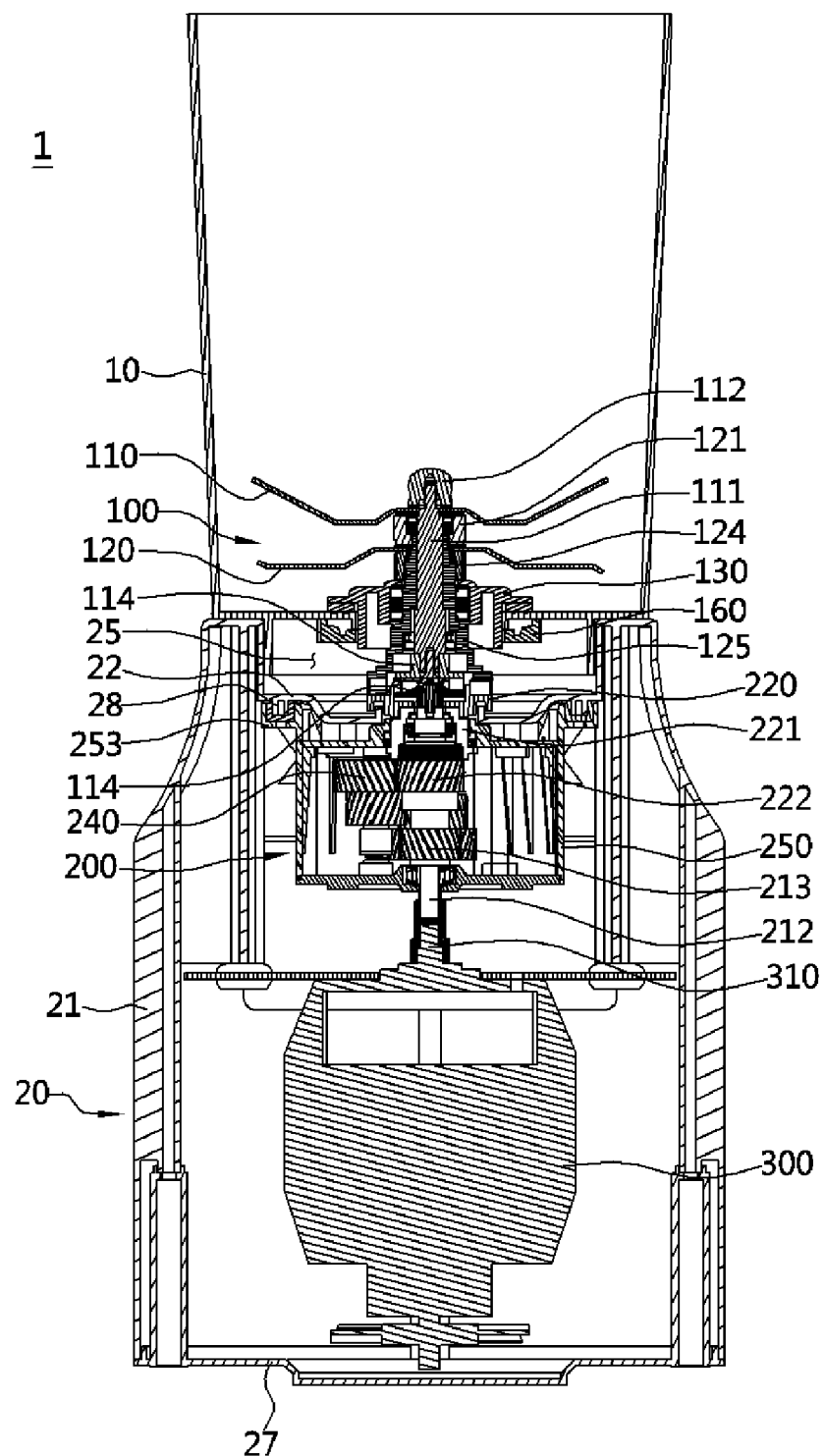
FIG. 1 is a cross-sectional view illustrating an inner structure of a blender according to the present disclosure.
Figure 2:
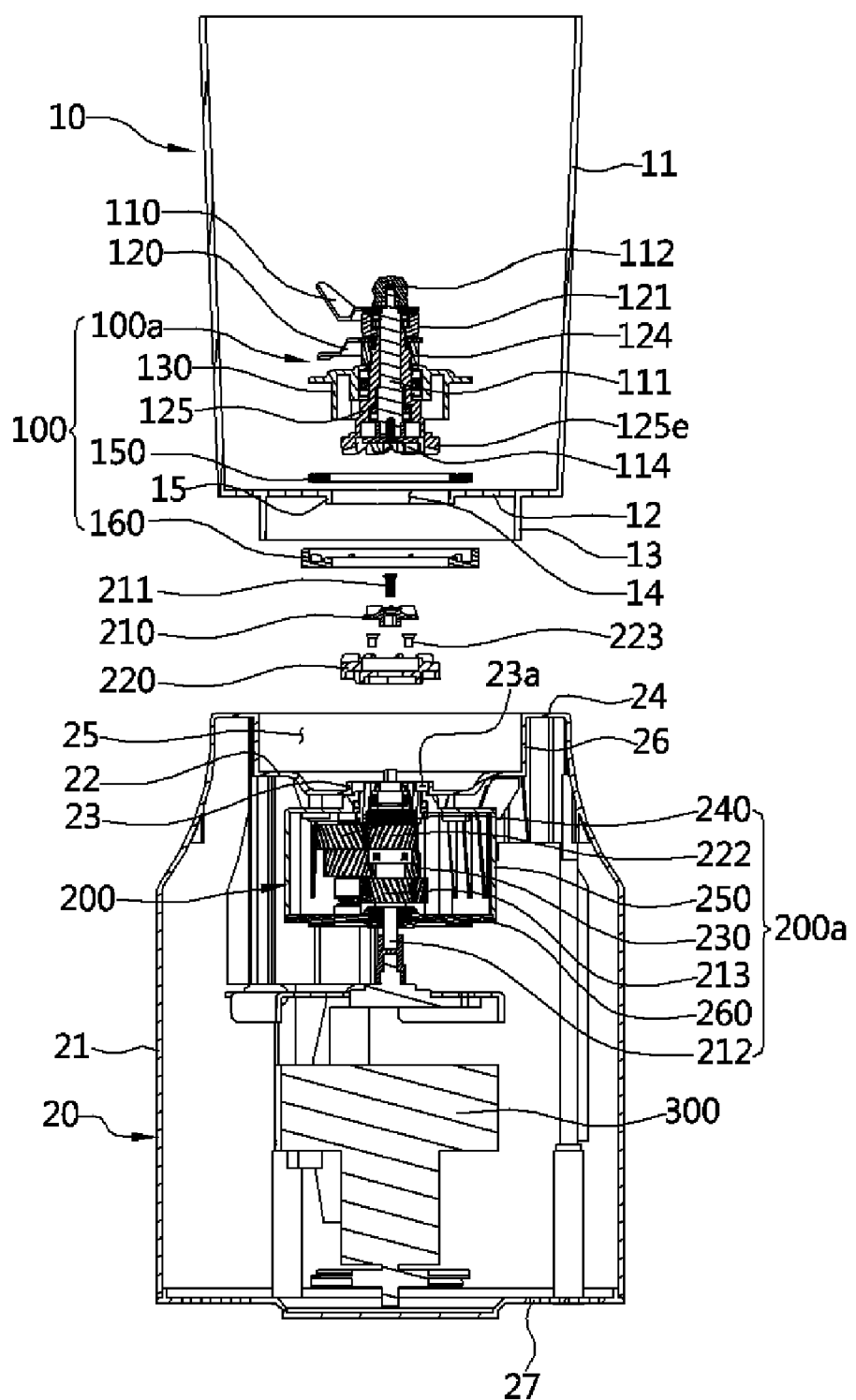
FIG. 2 is an exploded cross-sectional view of the blender illustrated in FIG. 1.

Referring to FIGS. 1 and 2, a blender 1 having bi-directionally rotatable blades according to the present disclosure includes a container 10, a blade assembly 100, a gearbox assembly 200, a motor 300, and a case 20.

The container 10 accommodates food and includes a container body 11 having a reverse trapezoidal cross-section, a through-hole 14 formed in a central portion of a bottom portion 12 of the container body 11, a through-hole flange 15 that protrudes downward from the bottom portion 12 along a circumference of an edge of the through-hole 14, and a container bottom flange 13 that has a diameter larger than that of the through-hole flange 15, protrudes downward from the bottom portion 12, and has a structure that is concentric with the through-hole flange 15.

The blade assembly 100 includes a blade bundle 100a, a sealing member 150 configured to maintain the airtightness between the blade bundle 100a and the bottom portion 12 of the container 10, and a fixing nut 160 configured to fix the blade bundle 100a to the bottom portion 12 of the container 10.

Figure 4:
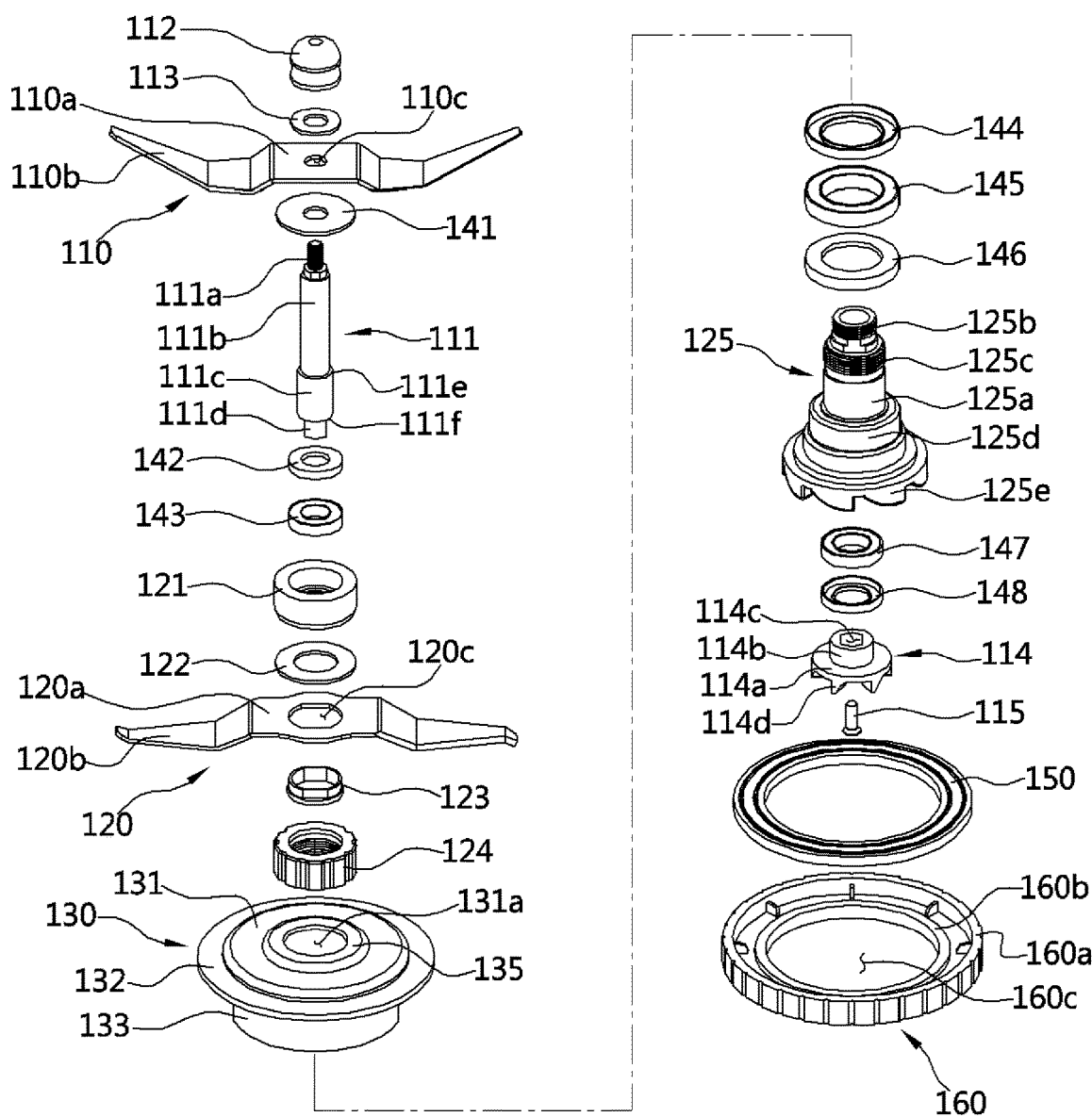
FIG. 4 is an exploded perspective view illustrating a configuration of a blade assembly illustrated in FIG. 1.
Figure 5:
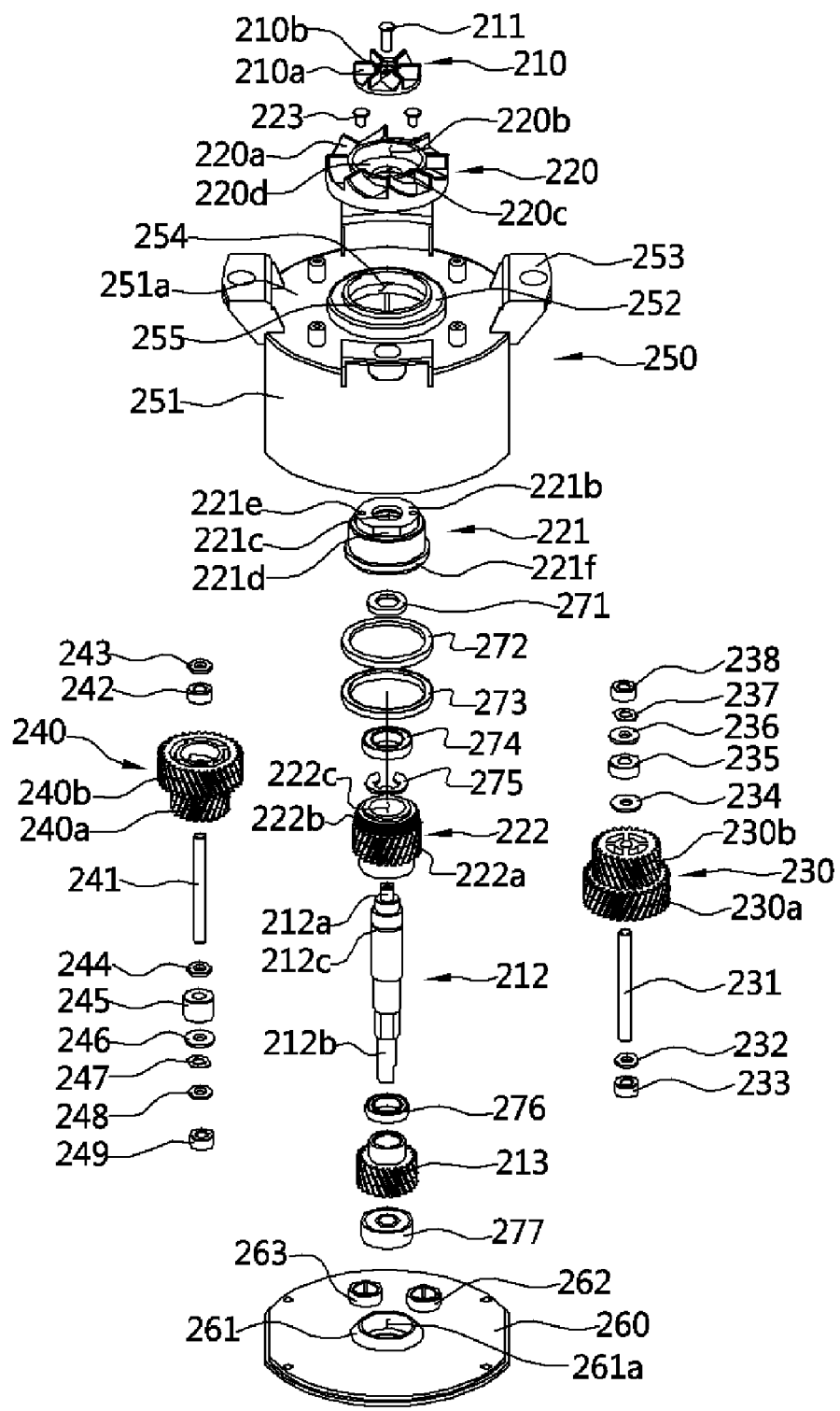
FIG. 5 is an exploded perspective view illustrating a configuration of a gearbox assembly illustrated in FIG. 1.
Figure 6:
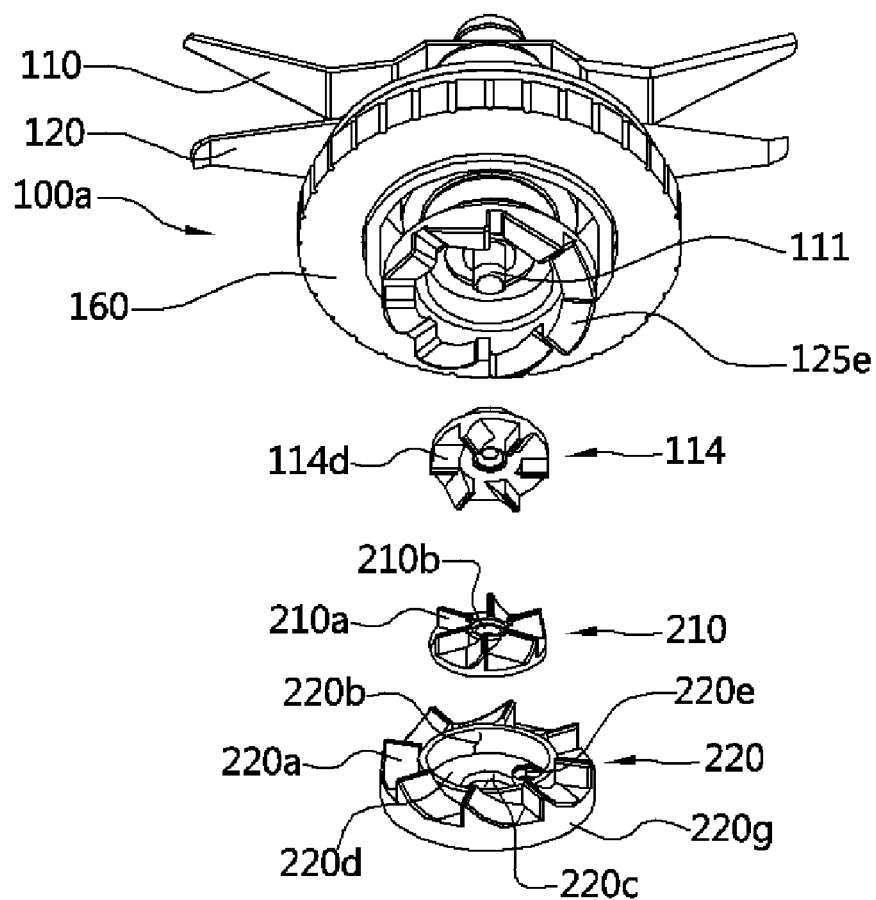
FIG. 6 is a perspective view illustrating the blade assembly, a first main coupler, a second main coupler, and a second reverse-rotation coupler that are illustrated in FIG. 1.
Figure 7:
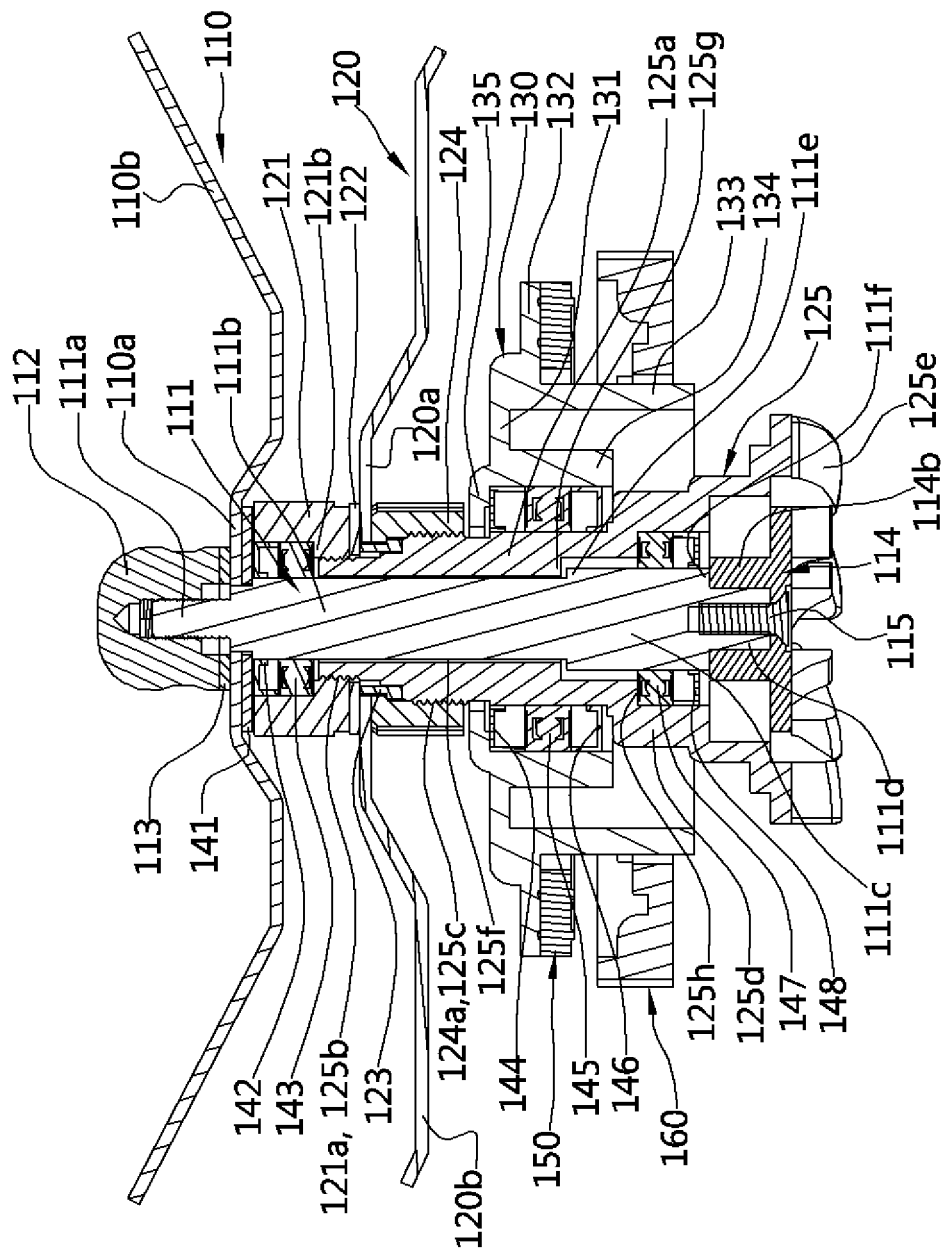
FIG. 7 is a cross-sectional view illustrating the configuration of the blade assembly illustrated in FIG. 1.

A specific configuration of the blade assembly 100 will be described with reference to FIGS. 4, 6, and 7.

The blade bundle 100a includes a main blade shaft 111 having a length in a vertical direction, a first blade 110 coupled to an upper portion of the main blade shaft 111, a first main coupler 114 coupled to a lower portion of the main blade shaft 111, and a shaft cap 112 coupled to an upper end of the main blade shaft 111 to fix the first blade 110.

The main blade shaft 111, the first blade 110, the first main coupler 114, and the shaft cap 112 rotate in a forward direction due to driving of the motor 300.

The first blade 110 includes a shaft connecting portion 110a in which a shaft through-hole 110c, into which a cap coupling portion 111a of the main blade shaft 111 is inserted, is formed and a blade portion 110b which extends toward both sides from both ends of the shaft connecting portion 110a. The blade portion 110b may have a shape that is bent in at least one place in a longitudinal direction.

The main blade shaft 111 includes the cap coupling portion 111a which has screw threads formed on an outer circumferential surface and is coupled to the shaft cap 112, a cylindrical shaft body 111b which has a diameter larger than that of the cap coupling portion 111a, a bearing support portion 111c which is formed on a lower portion of the shaft body 111b and has a diameter larger than that of the shaft body 111b, and a coupler coupling portion 111d which is formed on a lower portion of the bearing support portion 111c, has a diameter smaller than that of the bearing support portion 111c, and is coupled to the first main coupler 114.

A step 111e, i.e., a first step, is formed on a boundary portion between the shaft body 111b and the bearing support portion 111c due to a diameter difference thereof, and a step 111f, i.e., a second step, is formed on a boundary portion between the bearing support portion 111c and the coupler coupling portion 111d due to a diameter difference thereof.

The first main coupler 114 is axially coupled to the coupler coupling portion 111d by a fastening member 115. The first main coupler 114 includes a first main coupler body 114a formed in a disk shape, a main blade shaft coupling portion 114b that protrudes upward in a cylindrical shape from the center of the first main coupler body 114a, a main blade shaft coupling groove 114c that is formed on an upper surface of the main blade shaft coupling portion 114b so as to be concave downward, and a first main coupler connecting portion 114d that protrudes downward in the form of gear teeth from a bottom surface of the first main coupler body 114a so as to be connected to a second main coupler 210 and transmit forward rotation thereto.

A first blade fixing washer 113 is provided between the first blade 110 and the shaft cap 112 to increase a fastening force.

A blade washer 141 is provided between the first blade 110 and a second blade fixing member 121, which will be described below, to minimize friction during rotation of the first blade 110.

Also, the blade bundle 100a includes a reverse-rotation blade shaft 125 that has a structure which is coaxial with the main blade shaft 111 and through which the main blade shaft 111 passes, a first reverse-rotation coupler 125e integrally formed with a lower portion of the reverse-rotation blade shaft 125, a second blade 120 coupled to an upper portion of the reverse-rotation blade shaft 125, a second blade support member 124 configured to support a bottom surface of the second blade 120, and the second blade fixing member 121 configured to press an upper surface of the second blade 120 to fix the second blade 120.

The reverse-rotation blade shaft 125, the first reverse-rotation coupler 125e, the second blade 120, the second blade support member 124, and the second blade fixing member 121 rotate in a reverse direction due to the forward rotation of the motor 300 being converted to reverse rotation.

The second blade 120 includes a shaft connecting portion 120a in which a shaft through-hole 120c is formed and a blade portion 120b which extends toward both sides from both ends of the shaft connecting portion 120a. The blade portion 120b may have a shape that is bent in at least one place in a longitudinal direction.

A second blade fixing bush 123 is provided between an outer circumferential surface of the reverse-rotation blade shaft 125 passing through the shaft through-hole 120c and an inner circumferential surface of the shaft connecting portion 120a in which the shaft through-hole 120c is formed.

The reverse-rotation blade shaft 125 may have a cylindrical shape having a length in a vertical direction and may have a structure in which a plurality of stepped portions that gradually increase in diameter from top to bottom are formed.

The reverse-rotation blade shaft 125 includes a cylindrical shaft body portion 125a having a hollow inner portion, a first screw portion 125b screw-coupled to the second blade fixing member 121 through screw threads formed on an outer circumferential surface of an upper end of the shaft body portion 125a, a second screw portion 125c screw-coupled to the second blade support member 124 through screw threads formed on an outer circumferential surface of a lower portion of the first screw portion 125b, a bearing insertion portion 125d which is formed on a lower end of the shaft body portion 125a so as to be stepped in a shape having a diameter larger than a diameter of the lower end of the shaft body portion 125a and into which a third bearing 147 is inserted, and the first reverse-rotation coupler 125e formed on a lower portion of the bearing insertion portion 125d.

A shaft through-hole 125f that is hollow from top to bottom is formed inside the reverse-rotation blade shaft 125, and the main blade shaft 111 is inserted into the shaft through-hole 125f.

A stepped portion 125g, i.e., a first stepped portion, is formed in the reverse-rotation blade shaft 125, in which the shaft through-hole 125f is formed, so that an upper portion of an inner side surface of the shaft body portion 125a has a small diameter and a lower portion thereof has a large diameter, and a stepped portion 125h, i.e., a second stepped portion, is formed on a lower portion of the first stepped portion 125g so that a diameter of an inner side surface of the bearing insertion portion 125d is larger than the diameter of the inner side surface of the shaft body portion 125a.

When the main blade shaft 111 is inserted into the shaft through-hole 125f of the reverse-rotation blade shaft 125, the first step 111e of the main blade shaft 111 is caught at the first stepped portion 125g, and a depth of insertion of the main blade shaft 111 is limited. Thus, assembly work is facilitated.

Also, when the main blade shaft coupling groove 114c of the first main coupler 114 is inserted into the coupler coupling portion 111d of the main blade shaft 111 in order to couple the first main coupler 114 to the main blade shaft 111, an upper surface of the main blade shaft coupling portion 114b is caught at the second step 111f of the main blade shaft 111, and a depth at which the coupler coupling portion 111d is inserted into the main blade shaft coupling groove 114c is limited. Thus, the assembly work is facilitated.

The first reverse-rotation coupler 125e protrudes downward in the form of gear teeth from a lower end portion of the reverse-rotation blade shaft 125 and is connected to a second reverse-rotation coupler 220 to transmit reverse rotation thereto.

In a state in which an inner circumferential surface forming an inner space of the first reverse-rotation coupler 125e is spaced apart from an outer circumferential surface of the first main coupler 114, the first main coupler 114 is disposed in the inner space of the first reverse-rotation coupler 125e.

The second blade fixing member 121 is formed in a cylindrical shape having a hollow inner portion, and screw threads 121a are formed on a lower portion of an inner circumferential surface of the second blade fixing member 121 so that the second blade fixing member 121 is screw-coupled to the first screw portion 125b of the reverse-rotation blade shaft 125. An inner circumferential surface of the portion where the screw threads 121a are formed protrudes further inward than an inner circumferential surface of the upper portion of the second blade fixing member 121, and thus a stepped portion 121b is formed on the inner circumferential surface of the portion where the screw threads 121a are formed.

A first bearing 143 is inserted between the inner circumferential surface of the second blade fixing member 121 and the outer circumferential surface of the shaft body 111b to allow the second blade fixing member 121 and the main blade shaft 111 to rotate in opposite directions. A lower end of an outer ring of the first bearing 143 is supported by the stepped portion 121b of the second blade fixing member 121.

In order to prevent the oil leakage from the first bearing 143 and the permeation of moisture into the first bearing 143, a first oil seal 142 is provided at a position above the first bearing 143 and provided between the inner circumferential surface of the second blade fixing member 121 and the outer circumferential surface of the shaft body 111b.

A second blade fixing washer 122 is provided between the bottom surface of the second blade fixing member 121 and the upper surface of the second blade 120 to increase a fastening force of the second blade 120.

The second blade support member 124 is formed in a cylindrical shape having a hollow inner portion, screw threads 124a are formed on an inner circumferential surface of the second blade support member 124 so that the second blade support member 124 is screw-coupled to the second screw portion 125c of the reverse-rotation blade shaft 125, and an upper end surface of the second blade support member 124 is provided to come in contact with the bottom surface of the shaft connecting portion 120a of the second blade 120.

The blade bundle 100a further includes a holder body 130 provided on a lower portion of the second blade support member 124 to allow the blade bundle 100a to be seated on the bottom portion 12 of the container 10 in a state in which the blade bundle 100a passes through the through-hole 14 of the container 10.

The holder body 130 includes a first holder body body portion 135 in which a through-hole 131a is formed to allow the main blade shaft 111 and the reverse-rotation blade shaft 125 to pass therethrough, an annular second holder body body portion 131 that extends outward along a circumference of the first holder body body portion 135, an annular edge portion 132 that extends outward along a circumference of the second holder body body portion 131, a support portion 133, i.e., a first support that protrudes downward in a cylindrical shape from a bottom surface of the second holder body body portion 131, and a support portion 134, i.e., a second support that protrudes downward in a cylindrical shape from the bottom surface of the second holder body body portion 131 and has a structure that is spaced apart from an inner side of the first support portion 133 and is concentric with the first support portion 133.

The first holder body body portion 135 and the second holder body body portion 131 are illustrated as having a step formed thereon but may also have a uniform thickness without the step, and the first holder body body portion 135 and the second holder body body portion 131 may also be connected and constitute a single holder body body portion.

Since the first holder body body portion 135 is formed to have a stepped structure that protrudes higher than the second holder body body portion 131, a space may be secured inside the second support portion 134 in the vertical direction so that a second bearing 145, a second oil seal 144, and a third oil seal 146 may be inserted into the space. Also, instead of the stepped structure, the second support portion 134 may be formed to further extend downward to secure a space inside the second support portion 134 so that the second bearing 145, the second oil seal 144, and the third oil seal 146 may be inserted into the space.

When the first support portion 133 of the holder body 130 is inserted into the through-hole 14 of the container 10, and the edge portion 132 of the holder body 130 is caught at the bottom portion 12 around the through-hole 14 of the container 10, the blade bundle 100a is seated on the bottom portion 12 of the container 10.

The second bearing 145 is provided between an inner circumferential surface of the second support portion 134 and the outer circumferential surface of the reverse-rotation blade shaft 125, and the outer circumferential surface of the reverse-rotation blade shaft 125 is supported by an inner ring of the second bearing 145 so that the reverse rotation of the reverse-rotation blade shaft 125 is possible.

The second oil seal 144 and the third oil seal 146 configured to prevent the oil leakage from the second bearing 145 and the permeation of moisture into the second bearing 145 are respectively provided on an upper portion and a lower portion of the second bearing 145.

The first holder body body portion 135 is disposed on an upper portion of the second oil seal 144, and moisture may flow into the second bearing 145 through a gap formed between the first holder body body portion 135, which forms a circumference of an edge of the through-hole 131a, and the outer circumferential surface of the main blade shaft 111. However, due to the second oil seal 144 being provided, the flow of moisture may be prevented.

The third bearing 147, in which forward rotation occurs on an inner ring and reverse rotation occurs on an outer ring, is provided between the inner circumferential surface of the bearing insertion portion 125d of the reverse-rotation blade shaft 125 and the outer circumferential surface of the bearing support portion 111c of the main blade shaft 111.

An upper surface of the outer ring of the third bearing 147 is supported by the second stepped portion 125h of the reverse-rotation blade shaft 125.

A fourth oil seal 148 is provided on a lower portion of the third bearing 147 and inserted between the inner circumferential surface of the bearing insertion portion 125d of the reverse-rotation blade shaft 125 and the outer circumferential surface of the bearing support portion 111c of the main blade shaft 111 to prevent the oil leakage from the third bearing 147 and the permeation of moisture into the third bearing 147.

The fixing nut 160 is provided to be coupled to the holder body 130 to fix the blade bundle 100a to the bottom portion 12 of the container 10.

The fixing nut 160 is formed in an annular shape having a through-hole 160c formed therein and includes an outer flange 160a that extends upward along a circumference of an outer edge of the fixing nut 160 and an inner flange 160b that extends upward along a circumference of an inner edge of the fixing nut 160.

Screw threads are formed on an outer circumferential surface of a lower portion of the first support portion 133, screw threads are also formed on an inner circumferential surface of the inner flange 160b, and due to the screw threads being coupled, the fixing nut 160 and the holder body 130 are firmly coupled to each other.

When the fixing nut 160 and the holder body 130 are coupled to each other through the screw threads as described above, an upper surface of the outer flange 160a of the fixing nut 160 presses the bottom surface of the bottom portion 12 of the container 10 upward. Therefore, the sealing member 150 provided between the bottom surface of the edge portion 132 of the holder body 130 and an upper surface of the bottom portion 12 of the container 10 is pressed downward, and thus the airtightness is maintained between the bottom surface of the edge portion 132 and the upper surface of the sealing member 150 and between the bottom surface of the sealing member 150 and the upper surface of the bottom portion 12.

Also, when the blade assembly 100 is coupled to the container 10 using the fixing nut 160, since the blade assembly 100 may be easily separated from the container 10, it becomes easy to wash the container 10, and the user may disassemble the blade assembly 100 and then wash only the container 10. Thus, since the weight of the container 10 becomes light, an inconvenience due to the weight of the container 10 may be prevented when washing the container 10.

Figure 3:
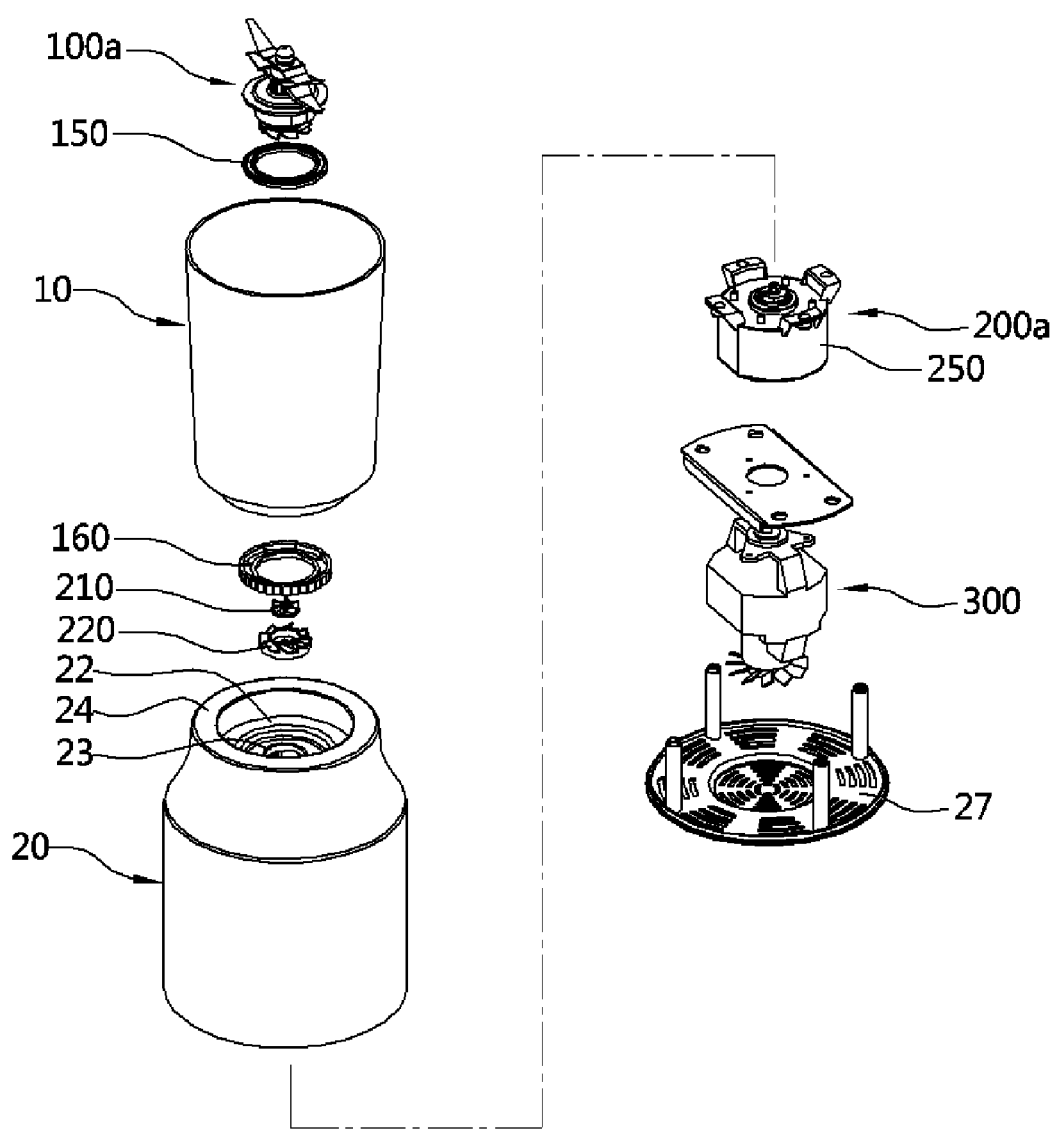
FIG. 3 is an exploded perspective view of the blender illustrated in FIG. 1.

Referring to FIGS. 1 to 3, the case 20, in which the motor 300 configured to generate forward rotation and the gearbox assembly 200 configured to simultaneously transmit the forward rotation of the motor 300 and convert the forward rotation to reverse rotation and then also transmit the reverse rotation are provided, is provided on a lower portion of the container 10.

The case 20 includes a case body 21 in which a tapered portion is formed along an outer circumference of an upper portion and a portion below the tapered portion is formed in a cylindrical shape, a container seating portion 24 that extends inward in a horizontal direction from an upper end of the case body 21 along a circumference thereof, a recessed portion wall body 26 that extends downward from an inner end portion of the container seating portion 24 so that a recessed portion 25 is formed in an inner space thereof, a case upper plate 22 that extends inward from a lower end of the recessed portion wall body 26 along a circumference thereof and that has a through-hole 23a (see FIG. 8) formed in a central portion, an inner flange 23 that protrudes upward from an inner edge portion of the case upper plate 22 surrounding the through-hole 23a, and a case cover 27 configured to cover an open lower portion of the case body 21.

The case upper plate 22 is disposed at a position lower than the container seating portion 24, which is the edge portion of the case 20, so that the recessed portion 25 is formed. When the container 10 is loaded on the upper portion of the case 20, the edge of the bottom portion 12 of the container 10 is seated on the container seating portion 24, and the container bottom flange 13 of the container 10 is inserted along the edge of the recessed portion 25. In this case, the container bottom flange 13 is guided by an inner circumferential surface of the recessed portion wall body 26. Also, after the container 10 and the case 20 are coupled to each other, the container bottom flange 13 is supported by the recessed portion wall body 26, and thus the movement of the container 10 may be prevented.

The second main coupler 210 and the second reverse-rotation coupler 220 are provided to pass through the through-hole 23a. Also, in the recessed portion 25, which is a space between the bottom portion 12 of the container 10 and the case upper plate 22, the first main coupler 114 and the second main coupler 210 are connected to each other, and the first reverse-rotation coupler 125e and the second reverse-rotation coupler 220 are connected to each other.

Since the upper portion of the gearbox assembly 200 is covered by the case upper plate 22, the flow of moisture or foreign matter into the gearbox assembly 200 may be prevented. Also, since the inner flange 23 protrudes to be higher than the central portion of the case upper plate 22, even when moisture flows into the recessed portion 25, the flow of moisture into the gearbox assembly 200 through the through-hole 23a (see FIG. 8) is prevented.

The case upper plate 22 is formed in a stepped shape in which an outer portion is high and an inner portion is low, and a plurality of upper plate bosses 28 are formed on an edge of a bottom surface of the case upper plate 22 so as to protrude downward. Gearbox fastening portions 253, which will be described below, are disposed on the upper plate bosses 28, and the upper plate bosses 28 and the gearbox fastening portions 253 are fastened to each other by fastening members (not illustrated). In this way, the gearbox assembly 200 is fixed to the case upper plate 22.

The second main coupler 210 and the second reverse-rotation coupler 220 are provided to be separable from the case upper plate 22 in an upward direction.

Also, since, in the recessed portion 25 which is the space between the container 10 and the case 20, the first main coupler 114 and the second main coupler 210 are connected to each other, and the first reverse-rotation coupler 125e and the second reverse-rotation coupler 220 are connected to each other, when the container 10 is separated from the upper side of the case 20, the couplers are disconnected. Therefore, since the gearbox assembly 200 is separated from the blade assembly 100 even when the user lifts the container 10 to wash the container 10, the weight of the container 10 becomes light, and thus user convenience may be improved.

Also, since, in the recessed portion 25, the first main coupler 114 is coupled to the main blade shaft 111 by the fastening member 115, the second main coupler 210 is coupled to a main gear shaft 212 by a fastening member 211, and the second reverse-rotation coupler 220 is coupled to a reverse-rotation gear connection shaft 221 by a fastening member 223, when the container 10 is separated upward from the case 20, the first main coupler 114, the second main coupler 210, and the second reverse-rotation coupler 220 may be easily separated. Therefore, when a failure occurs in the couplers 114, 210, and 220 and components connected thereto and repair is necessary, since the couplers 114, 210, and 220 may be easily replaced, the repair work is facilitated.

A specific configuration of the gearbox assembly 200 will be described with reference to FIGS. 5, 6, 8, and 9.

The gearbox assembly 200 includes the second main coupler 210 engaged with the first main coupler 114, the main gear shaft 212 having an upper end coupled to the second main coupler 210 and a lower end coupled to a shaft 310 (see FIG. 1) of the motor 300 so as to rotate in the forward direction, a plurality of gears 213, 230, 240, and 222 configured to convert the forward rotation of the main gear shaft 212 to reverse rotation, the second reverse-rotation coupler 220 configured to transmit the reverse rotation transmitted through the plurality of gears 213, 230, 240, and 222 to the first reverse-rotation coupler 125e, and a gearbox housing 250 configured to surround outer sides of the second main coupler 210, the main gear shaft 212, the plurality of gears 213, 230, 240, and 222, and the second reverse-rotation coupler 220.

Since the main gear shaft 212 and the plurality of gears 213, 230, 240, and 222 that generate operational noise in a process of transmitting the rotational force of the motor 300 are provided inside the gearbox housing 250, and the gearbox housing 250 is provided inside the case 20, the main gear shaft 212 and the plurality of gears 213, 230, 240, and 222 that generate the operational noise are doubly-surrounded by the gearbox housing 250 and the case 20, and thus the generation of operational noise may be minimized when driving the motor 300.

As illustrated in FIG. 3, the gearbox assembly 200 may be separated into the second main coupler 210, the second reverse-rotation coupler 220, and a gearbox sub-assembly 200a. The gearbox sub-assembly 200a may be configured to include the main gear shaft 212, the plurality of gears 213, 230, 240, and 222, and the gearbox housing 250.

A second main coupler connecting portion 210a is formed to protrude upward in the form of gear teeth from an upper surface of the second main coupler 210, and the second main coupler connecting portion 210a is engaged with the gear teeth of the first main coupler connecting portion 114d of the first main coupler 114 to transmit the forward rotation. A shaft connecting portion 210c that protrudes downward in a cylindrical shape and has an inner space through which the fastening member 211 passes is formed on a bottom surface of the second main coupler 210, and a fastening hole 210b through which the fastening member 211 vertically passes to be screw-coupled is formed in an upper portion of the inner space of the shaft connecting portion 210c.

A reverse-rotation coupler connecting portion 220a is formed to protrude upward in the form of gear teeth from an upper surface of the second reverse-rotation coupler 220, and the reverse-rotation coupler connecting portion 220a is engaged with the first reverse-rotation coupler 125e to transmit the reverse rotation.

A coupler insertion space 220b, which has a shape in which a central portion of an upper surface of the second reverse-rotation coupler 220 is concavely formed, is formed in the second reverse-rotation coupler 220, a second reverse-rotation coupler body portion 220d, which has the shape of a flat plate, is formed on a lower portion of the coupler insertion space 220b, a shaft through-hole 220c, which vertically passes through the second reverse-rotation coupler body portion 220d, is formed therein, and a fastening hole 220e is formed in a side portion of the shaft through-hole 220c.

In a state in which an inner circumferential surface forming the coupler insertion space 220b, which is the inner space of the second reverse-rotation coupler 220, and the outer circumferential surface of the second main coupler 210 are spaced apart, the second main coupler 210 is disposed in the coupler insertion space 220b, and the second main coupler 210 and the main gear shaft 212 are coupled to each other by the fastening member 211 through the shaft through-hole 220c. A lower connecting portion 220f is formed to protrude downward along a circumference of an edge of a bottom surface of the second reverse-rotation coupler body portion 220d, and the reverse-rotation gear connection shaft 221, which will be described below, is connected at the lower connecting portion 220f.

Figure 8:
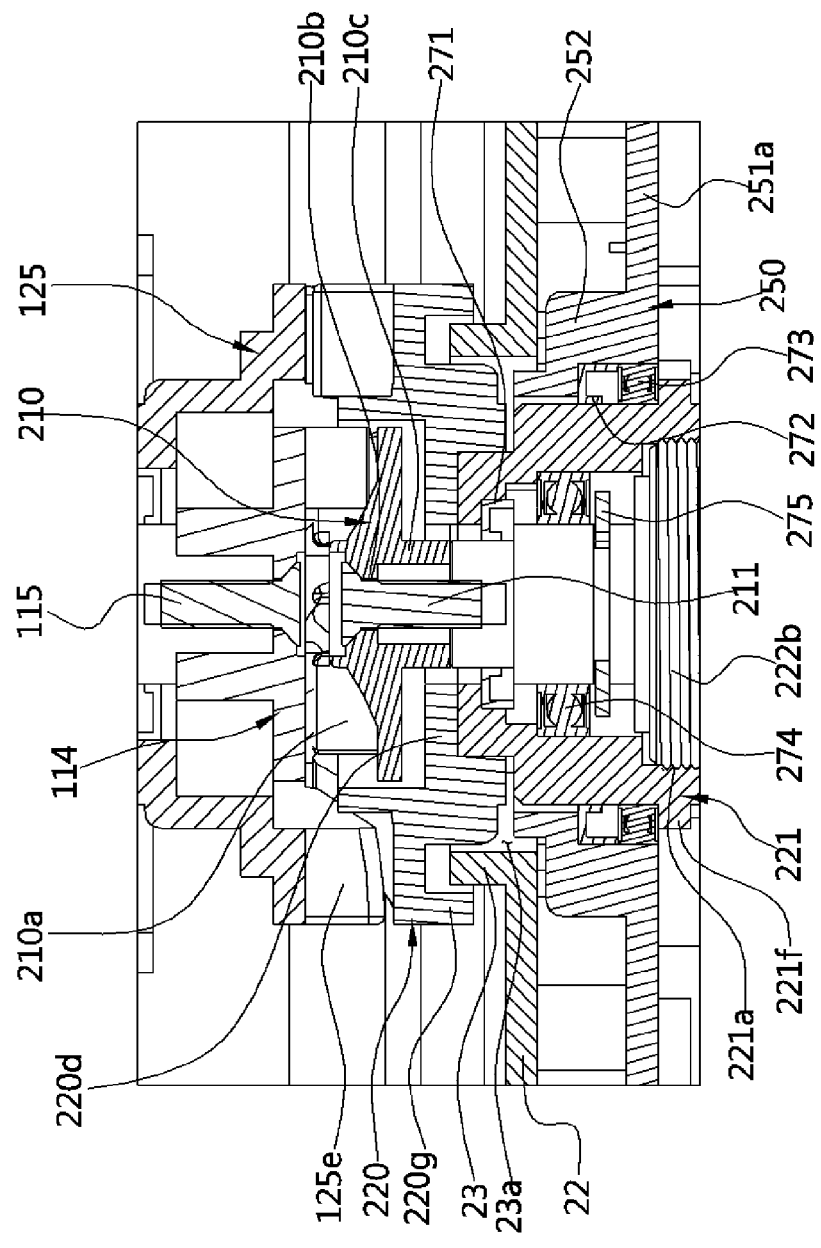
FIG. 8 is a cross-sectional view illustrating a connection structure of couplers illustrated in FIG. 1.
Figure 9:
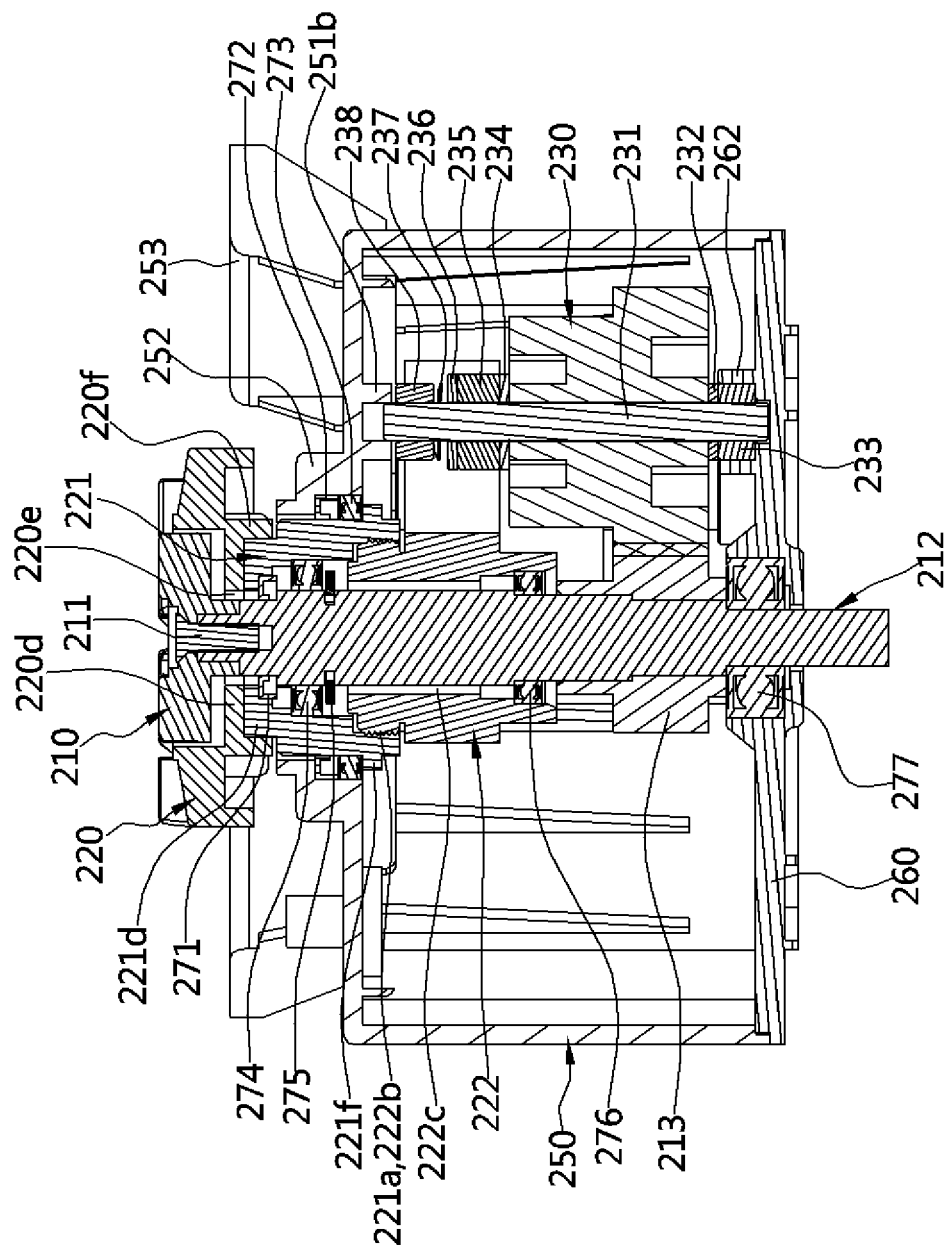
FIG. 9 is a cross-sectional view illustrating the configuration of the gearbox assembly illustrated in FIG. 1.

A reverse-rotation coupler edge 220g is formed to extend downward from a circumference of an outer edge of the reverse-rotation coupler connecting portion 220a. As illustrated in FIG. 8, the reverse-rotation coupler edge 220g is disposed at an outer circumference of the inner flange 23, and to allow a lower end of the reverse-rotation coupler edge 220g to be disposed at a position lower than the upper end of the inner flange 23, the reverse-rotation coupler edge 220g and the inner flange 23 are provided to have a structure in which at least some portions thereof overlap in the vertical direction at the inner side and outer side. Due to the overlapping structure, the flow of moisture into the gearbox assembly 200 through the through-hole 23a may be more reliably prevented.

The main gear shaft 212 is formed to have a length in the vertical direction, an upper end portion 212a of the main gear shaft 212 passes through the shaft through-hole 220c and is axially coupled to the second main coupler 210 by the fastening member 211, and a lower end portion 212b of the main gear shaft 212 is connected to the shaft 310 of the motor 300 and rotates in the forward direction due to driving of the motor 300. A ring insertion groove 212c is formed in a lower portion of the upper end portion 212a so as to be concave inward from an outer circumferential surface thereof.

The gearbox housing 250 includes a cylindrical housing body 251 having an open lower portion and the plurality of gearbox fastening portions 253 that protrude upward from an edge of an upper surface of a housing upper body 251a that covers an upper portion of the housing body 251.

A through-hole 254 is formed in the central portion of the housing upper body 251a, a housing central flange 252 is formed on the housing upper body 251a to extend upward along a circumference of an edge on which the through-hole 254 is formed and then to be bent inward, and a housing central protrusion 255 is formed to protrude upward from an inner side of the housing central flange 252.

A first shaft support boss 251b (see FIG. 9) is formed to protrude downward from a bottom surface of the housing upper body 251a, and a second shaft support boss (not illustrated) having the same shape as the first shaft support boss 251b is formed at a position adjacent to the first shaft support boss 251b.

A gearbox housing cover 260 configured to cover the open lower portion of the housing body 251 is provided. A shaft passage hole 261a through which the lower end portion of the main gear shaft 212 passes is formed in a central portion of an upper surface of the gearbox housing cover 260, and a shaft insertion portion 261 is formed to protrude upward from the upper surface of the gearbox housing cover 260 along a circumference of the shaft passage hole 261a. A first support boss 262 and a second support boss 263 are formed to protrude upward in a cylindrical shape from the upper surface of the gearbox housing cover 260 around the shaft insertion portion 261.

The plurality of gears 213, 230, 240, and 222 include a main gear 213 coupled to the main gear shaft 212 to rotate in the forward direction, a first sub-gear 230 engaged with the main gear 213 to rotate in the reverse direction, a second sub-gear 240 engaged with the first sub-gear 230 to rotate in the forward direction, and a reverse-rotation gear 222 engaged with the second sub-gear 240 to rotate in the reverse direction.

The first sub-gear 230 includes a main gear engagement portion 230a engaged with gear teeth formed on an outer circumferential surface of the main gear 213 and a second sub-gear engagement portion 230b that is integrally formed with an upper portion of the main gear engagement portion 230a and has a diameter smaller than a diameter of the main gear engagement portion 230a.

A first sub-gear shaft 231 is provided to pass through the center of the first sub-gear 230 and stand upright in the vertical direction to allow the reverse rotation of the first sub-gear 230, and, in the first sub-gear shaft 231, a plurality of bushes 233, 235, and 238 and a plurality of washers 232, 234, 236, and 237 are respectively provided on an upper portion and a lower portion of the first sub-gear 230

An upper end and a lower end of the first sub-gear shaft 231 are inserted into the first shaft support boss 251b of the gearbox housing 250 and the first support boss 262 of the gearbox housing cover 260, respectively, so as to be supported.

At the upper portion of the first sub-gear 230, the bush 238, the washers 237 and 236, the bush 235, and the washer 234 are sequentially coupled from the upper portion of the first sub-gear shaft 231 to the lower portion thereof.

Also, at the lower portion of the first sub-gear 230, the washer 232 and the bush 233 are coupled to the first sub-gear shaft 231. The ring-shaped bush 233 fitted to the lower end of the first sub-gear shaft 231 is inserted into the first support boss 262.

The second sub-gear 240 includes a first sub-gear engagement portion 240a engaged with the second sub-gear engagement portion 230b and a reverse-rotation gear engagement portion 240b that is integrally formed with an upper portion of the first sub-gear engagement portion 240a and has a diameter larger than a diameter of the first sub-gear engagement portion 240a.

A second sub-gear shaft 241 is provided to pass through the center of the second sub-gear 240 and stand upright in the vertical direction to allow the forward rotation of the second sub-gear 240, and, in the second sub-gear shaft 241, a plurality of bushes 242, 245, and 249 and a plurality of washers 243, 244, 246, 247, and 248 are respectively provided on an upper portion and a lower portion of the second sub-gear 240.

An upper end and a lower end of the second sub-gear shaft 241 are inserted into the second shaft support boss of the gearbox housing 250 and the second support boss 263 of the gearbox housing cover 260, respectively, so as to be supported.

At the upper portion of the second sub-gear 240, the washer 243 and the bush 242 are coupled to the second sub-gear shaft 241.

Also, at the lower portion of the second sub-gear 240, the washer 244, the bush 245, the washers 246, 247, and 248, and the bush 249 are sequentially coupled from the upper portion of the second sub-gear shaft 241 to the lower portion thereof. The ring-shaped bush 249 fitted to the lower end of the second sub-gear shaft 241 is inserted into the second support boss 263.

Outer circumferential surfaces of the main gear 213, the first sub-gear 230, the second sub-gear 240, and the reverse-rotation gear 222 for the engagement thereof are formed in the shape of a helical gear.

In this embodiment, the second sub-gear engagement portion 230b has a smaller diameter than the main gear engagement portion 230a of the first sub-gear 230, and the reverse-rotation gear engagement portion 240b has a larger diameter than the first sub-gear engagement portion 240a of the second sub-gear 240. However, the diameters may be configured to be different from those in the embodiment when a gear ratio between the engagement portions of the main gear 213 and the first sub-gear 230, a gear ratio between the engagement portions of the first sub-gear 230 and the second sub-gear 240, and a gear ratio between the engagement portions of the second sub-gear 240 and the reverse-rotation gear 222 are adjusted.

Also, since the first sub-gear 230 and the second sub-gear 240 have double gear structures with different diameters so as to have different gear ratios, through the adjustment of the gear ratios, the rotational speeds of the first blade 110 and the second blade 120 may be adjusted to various speeds, and a rotational speed higher than a basic rotational speed of the motor 300 may also be obtained.

For example, when the gear ratio between the main gear 213 and the first sub-gear 230 is configured as 1:1.5, the gear ratio between the first sub-gear 230 and the second sub-gear 240 is configured as 1.5:1.5, and the gear ratio between the second sub-gear 240 and the reverse-rotation gear 222 is configured as 1.5:2, since the rotational speed of the first blade 110 and the rotational speed of the second blade 120 are different by a factor of two, even when a low RPM motor is used, the rotational speed of the second blade 120 may be configured to be a rotational speed that is twice as high as the rotational speed of the first blade 110.

The reverse-rotation gear 222 is formed so that a shaft through-hole 222c, through which the main gear shaft 212 passes, passes through from the upper portion of the center of the reverse-rotation gear 222 to the lower portion thereof. Thus, the reverse-rotation gear 222 has a structure that is coaxial with the main gear shaft 212.

A second sub-gear engagement portion 222a engaged with the reverse-rotation gear engagement portion 240b of the second sub-gear 240 is formed on an outer circumferential surface of a central portion of the reverse-rotation gear 222, screw threads 222b for coupling to the reverse-rotation gear connection shaft 221 are formed on an outer circumferential surface of an upper portion of the reverse-rotation gear 222, and since an inner circumferential surface of the shaft through-hole 222c is spaced apart from the outer circumferential surface of the main gear shaft 212, the forward rotation of the main gear shaft 212 is not transmitted to the reverse-rotation gear 222.

The reverse-rotation gear connection shaft 221 is formed in a cylindrical shape, screw threads 221a, which are screw-coupled to the screw threads 222b of the reverse-rotation gear 222, are formed on an inner circumferential surface of a lower end of the reverse-rotation gear connection shaft 221, and an upper end portion of the reverse-rotation gear connection shaft 221 is connected to the second reverse-rotation coupler 220 to transmit the reverse rotation to the second reverse-rotation coupler 220.

A coupler connecting portion 221d for connection to the second reverse-rotation coupler 220 is formed on an upper portion of the reverse-rotation gear connection shaft 221, and a shaft through-hole 221c through which the upper end portion of the main gear shaft 212 passes is formed in an upper surface 221b of the coupler connecting portion 221d.

The coupler connecting portion 221d has a circular cross-section in which a D-cut is made in edge portions of both sides opposite to each other, and the lower connecting portion 220f of the second reverse-rotation coupler 220 is formed in a shape that corresponds to the coupler connecting portion 221d so that the coupler connecting portion 221d is inserted into the lower connecting portion 220f.

Also, a pair of fastening holes 221e are formed in the upper surface 221b of the coupler connecting portion 221d, and using the fastening member 223, fastening is performed in the fastening hole 220e of the second reverse-rotation coupler 220 and the fastening holes 221e of the reverse-rotation gear connection shaft 221.

A protruding edge 221f is formed to protrude outward from a lower portion of an outer circumferential surface of the reverse-rotation gear connection shaft 221.

A fifth bearing 274 is inserted between an inner circumferential surface of the reverse-rotation gear connection shaft 221 and the outer circumferential surface of the main gear shaft 212, and thus the main gear shaft 212 and the reverse-rotation gear connection shaft 221 may rotate in opposite directions.

In order to prevent the oil leakage from the fifth bearing 274 and the permeation of moisture into the fifth bearing 274, a fifth oil seal 271 is provided at a position above the fifth bearing 274 and provided between the inner circumferential surface of the reverse-rotation gear connection shaft 221 and the outer circumferential surface of the main gear shaft 212.

A stopper ring 275 is provided at a position below the fifth bearing 274 and is fitted into the ring insertion groove 212c of the main gear shaft 212 so that, when the main gear shaft 212 is assembled to the inner portion of the gearbox housing 250, the stopper ring 275 is caught at the fifth bearing 274 to regulate a position at which the main gear shaft 212 is assembled and to prevent the fifth bearing 274 from being detached downward.

A fourth bearing 273 is inserted between the outer circumferential surface of the reverse-rotation gear connection shaft 221 and an inner circumferential surface of the housing central flange 252 of the gearbox housing 250 to allow the reverse rotation of the reverse-rotation gear connection shaft 221.

In order to prevent the oil leakage from the fourth bearing 273 and the permeation of moisture into the fourth bearing 273, a sixth oil seal 272 is provided at a position above the fourth bearing 273 and provided between the outer circumferential surface of the reverse-rotation gear connection shaft 221 and the inner circumferential surface of the housing central flange 252.

When the fifth oil seal 271 and the sixth oil seal 272 are respectively provided on the inner side and outer side of the reverse-rotation gear connection shaft 221 as described above, the overlapping structure between the inner flange 23, which protrudes upward from the case upper plate 22, and the reverse-rotation coupler edge 220g first block the flow of moisture into the gearbox assembly 200, and the fifth oil seal 271 and the sixth oil seal 272 secondarily block the flow of moisture into the gearbox assembly 200. Therefore, the durability of the components provided inside the gearbox assembly 200 may be improved.

A lower portion of an inner ring of the fourth bearing 273 may be supported by the protruding edge 221f of the reverse-rotation gear connection shaft 221.

A sixth bearing 276 is provided between an inner circumferential surface of a lower portion of the reverse-rotation gear 222 and the outer circumferential surface of the main gear shaft 212, and thus the reverse-rotation gear 222 and the main gear shaft 212 may rotate in opposite directions.

A seventh bearing 277 is provided between an inner circumferential surface of the shaft insertion portion 261 of the gearbox housing cover 260 and an outer circumferential surface of the lower end portion 212b of the main gear shaft 212 to allow the forward rotation of the main gear shaft 212.

Figure 10:
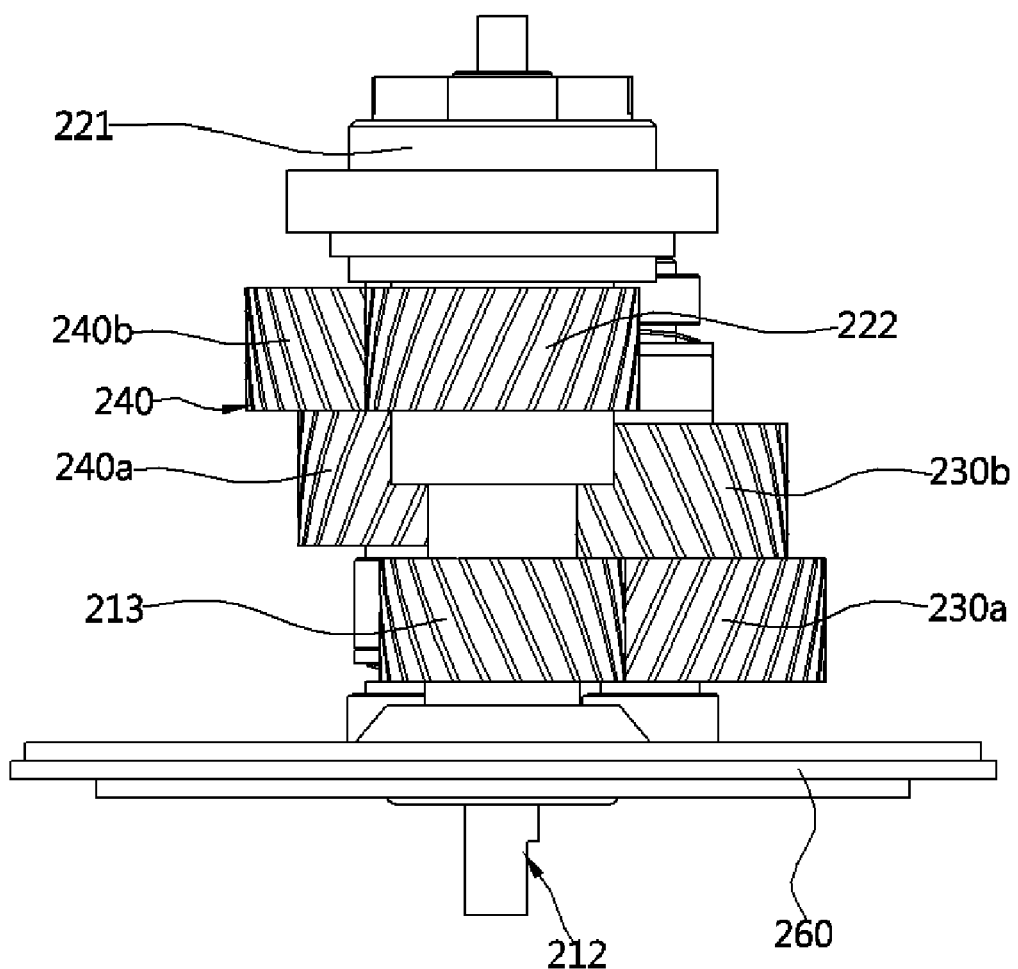
FIG. 10 is a view illustrating gears provided in the gearbox assembly illustrated in FIG. 1.
Figure 11:
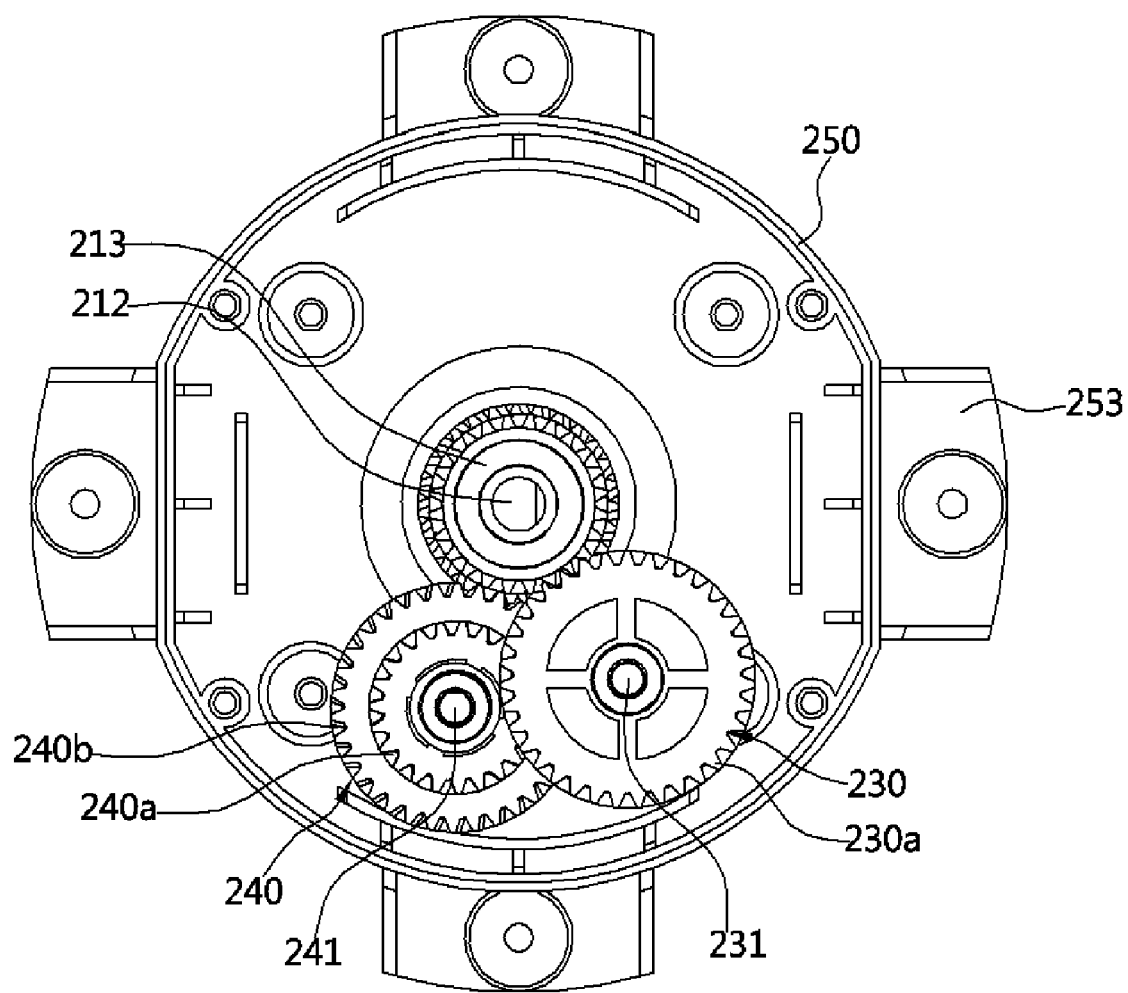
FIG. 11 is a bottom view of a gearbox sub-assembly from which a gearbox housing cover is removed.

Referring to FIGS. 10 and 11, the main gear shaft 212 is disposed at the central portion of the gearbox housing 250, and the first sub-gear shaft 231 and the second sub-gear shaft 241 are provided at positions adjacent to the circumference of the main gear shaft 212.

The main gear engagement portion 230a of the first sub-gear 230 and the main gear 213 are disposed at corresponding heights so as to be engaged with each other, the second sub-gear engagement portion 230b of the first sub-gear 230 and the first sub-gear engagement portion 240a of the second sub-gear 240 are disposed at corresponding heights so as to be engaged with each other, and the reverse-rotation gear engagement portion 240b of the second sub-gear 240 and the reverse-rotation gear 222 are disposed at corresponding heights so as to be engaged with each other.

In this case, the main gear engagement portion 230a and the second sub-gear engagement portion 230b of the first sub-gear 230 have different diameters, the first sub-gear engagement portion 240a and the reverse-rotation gear engagement portion 240b of the second sub-gear 240 have different diameters, the reverse-rotation gear engagement portion 240b and the main gear engagement portion 230a that have larger diameters are disposed at the upper portion and the lower portion, respectively, and the second sub-gear engagement portion 230b and the first sub-gear engagement portion 240a that have smaller diameters are disposed between the upper portion and the lower portion. Thus, the first sub-gear 230 and the second sub-gear 240 are provided to partially overlap each other when viewed from a plan view as shown in FIG. 11.

Due to such a configuration, the first sub-gear 230 and the second sub-gear 240, which are configured to convert the forward rotation to the reverse rotation, may be provided to occupy a small space inside the gearbox assembly 200.

In the blender having the above configuration, when the motor 300 is driven, the main gear shaft 212, the main gear 213, the second main coupler 210, the first main coupler 114, the main blade shaft 111, and the first blade 110 that are connected to the shaft 310 of the motor 300 rotate in the forward direction.

Simultaneously, the first sub-gear 230 engaged with the main gear 213 rotates in the reverse direction, the second sub-gear 240 engaged with the first sub-gear 230 rotates in the forward direction, and the reverse-rotation gear 222 engaged with the second sub-gear 240 rotates in the reverse direction. In this way, the forward rotation of the main gear 213 is converted to the reverse rotation.

Due to the reverse rotation of the reverse-rotation gear 222, the reverse-rotation gear connection shaft 221, the second reverse-rotation coupler 220, the first reverse-rotation coupler 125e, the reverse-rotation blade shaft 125, the second blade support member 124, the second blade 120, and the second blade fixing member 121 rotate in the reverse direction.

As described above, since, in the recessed portion 25 which is the space formed between the container 10 and the case 20, the first main coupler 114 and the second main coupler 210 are detachably connected to each other, and the first reverse-rotation coupler 125e and the second reverse-rotation coupler 220 are detachably connected to each other, when the container 10 is separated from the case 20, only the blade assembly 100 remains coupled to the container 10, and the gearbox assembly 200 stays inside the case 20. Therefore, since the container 10 coupled to the blade assembly 100 is lightweight, inconvenience to the user due to the weight of the container 10 may be prevented.

Also, since the blade assembly 100 may be easily disassembled from the container 10, the container 10 and the blade assembly 100 may be washed in a state in which the blade assembly 100 is removed from the container 10. Therefore, it is possible to prevent the user from getting injured due to a blade when washing the container 10 and the blade assembly 100.

Also, when the container 10 and the blade assembly 100 are separated from the case 20, since the second main coupler 210 and the second reverse-rotation coupler 220 are exposed to the upper side of the case upper plate 22 of the case 20, the second main coupler 210 and the second reverse-rotation coupler 220 may be easily separated from the gearbox assembly 200. Therefore, separate washing of the second main coupler 210 and the second reverse-rotation coupler 220 is facilitated.

In addition, since the plurality of gears 213, 230, 240, and 222 are provided inside the gearbox assembly 200, and the flow of foreign matter, including moisture, into the gearbox assembly 200 is blocked, the durability of the components inside the gearbox assembly 200 may be improved.

Exemplary embodiments of the present disclosure have been described above in detail, but the present disclosure is not limited to the above-described embodiments. The present disclosure may be modified and embodied in various other ways within the scope of the claims, the detailed description, and the accompanying drawings, and such modifications also belong to the present disclosure.

DESCRIPTION OF REFERENCE NUMERALS

| | |
|---|---|
| 10: container | 11: container body |
| 12: bottom portion | 13: container bottom flange |
| 14: through-hole | 15: through-hole flange |
| 20: case | 21: case body |
| 22: case upper surface | 23: inner flange |
| 23a: through-hole | 24: container seating portion |
| 26: recessed portion wall body | 27: case cover |
| 28: upper plate boss | 100: blade assembly |
| 100a: blade bundle | 110: first blade |
| 110a: shaft connecting portion | 110b: blade portion |
| 110c: shaft through-hole | 111: main blade shaft |
| 111a: cap coupling portion | 111b: shaft body |
| 111c: bearing support portion | 111d: coupler coupling portion |
| 111e: first step | 111f: second step |
| 112: shaft cap | 113: first blade fixing washer |
| 114: first main coupler | 114a: first main coupler body |
| 114b: main blade shaft coupling portion | 114c: main blade shaft coupling groove |
| 114d: first main coupler connecting portion | 120: second blade |
| 120a: shaft connecting portion | 120b: blade portion |
| 120c: shaft through-hole | 121: second blade fixing member |
| 121a: screw thread | 121b: stepped portion |
| 122: second blade fixing washer | 123: second blade fixing bush |
| 124: second blade support member | 124a: screw thread |
| 125: reverse-rotation blade shaft | 125a: shaft body portion |
| 125b: first screw portion | 125c: second screw portion |
| 125d: bearing insertion portion | 125e: first reverse-rotation coupler |
| 125f: shaft through-hole | 125g: first stepped portion |
| 125h: second stepped portion | 130: holder body |
| 131: second holder body body portion | 131a: through-hole |
| 132: edge portion | 133: first support portion |
| 134: second support portion | 135: first holder body body portion |
| 141: blade washer | 142: first oil seal |
| 143: first bearing | 144: second oil seal |
| 145: second bearing | 146: third oil seal |
| 147: third bearing | 148: fourth oil seal |
| 150: sealing member | 160: fixing nut |
| 160a: outer flange | 160b: inner flange |
| 160c: through-hole | 200: gearbox assembly |
| 200a: gearbox sub-assembly | 210: second main coupler |
| 210a: second main coupler connecting portion | 210b: fastening hole |
| 210c: shaft connecting portion | 211: fastening member |
| 212: main gear shaft | 212a: upper end portion |
| 212b: lower end portion | 212c: ring insertion groove |
| 213: main gear | 220: second reverse-rotation coupler |
| 220a: reverse-rotation coupler connecting portion | |
| 220b: coupler insertion space | |
| 220c: shaft through-hole | |
| 220d: second reverse-rotation coupler body portion | |
| 220e: fastening hole | 220f: lower connecting portion |
| 220g: reverse-rotation coupler edge | |
| 221: reverse-rotation gear connection shaft | |

| | |
|---|---|
| 221a: screw thread | 221b: upper surface |
| 221c: shaft through-hole | 221d: coupler connecting portion |
| 221e: fastening hole | 221f: protruding edge |
| 222: reverse-rotation gear | 222a: second sub-gear engagement portion |
| 222b: screw thread | 222c: shaft through-hole |
| 223: fastening member | 230: first sub-gear |
| 230a: main gear engagement portion | |
| 230b: second sub-gear engagement portion | |
| 231: first sub-gear shaft | 232, 236, 237: washer |
| 233, 238: bush | 240: second sub-gear |
| 240a: first sub-gear engagement portion | |
| 240b: reverse-rotation gear engagement portion | |
| 241: second sub-gear shaft | 242, 245, 249: bush |
| 243, 244, 246, 247, 248: washer | 250: gearbox housing |
| 251: housing body | 251a: housing upper body |
| 251b: first shaft support boss | 252: housing central flange |
| 253: gearbox fastening portion | 254: through-hole |
| 255: housing central protrusion | 260: gearbox housing cover |
| 261: shaft insertion portion | 261a: shaft passage hole |
| 262: first support boss | 263: second support boss |
| 271: fifth oil seal | 272: sixth oil seal |
| 273: fourth bearing | 274: fifth bearing |
| 275: stopper ring | 276: sixth bearing |
| 277: seventh bearing | 300: motor |

The invention claimed is:

1. A blender having bi-directionally rotatable blades, the blender comprising:

a container configured to accommodate food;

a blade assembly including a main blade shaft that has an upper portion coupled to a first blade and a lower portion coupled to a first main coupler so as to rotate in a forward direction and a reverse-rotation blade shaft that has an upper portion coupled to a second blade and a lower portion coupled to a first reverse-rotation coupler so as to rotate in a reverse direction and that has a structure which is coaxial with the main blade shaft and through which the main blade shaft passes;

a gearbox assembly including a main gear shaft coupled to a second main coupler, which is engaged with the first main coupler, so as to rotate in the forward direction, a plurality of gears configured to convert the forward rotation of the main gear shaft to reverse rotation, a second reverse-rotation coupler configured to transmit the reverse rotation transmitted through the plurality of gears to the first reverse-rotation coupler, and a gearbox housing configured to surround outer sides of the main gear shaft, the plurality of gears, and the second reverse-rotation coupler; and a case that has the gearbox assembly provided therein and a case upper plate formed to cover an upper portion of the gearbox assembly, the case upper plate being formed so that the second main coupler and the second reverse-rotation coupler pass therethrough, wherein the plurality of gears include:

a main gear coupled to the main gear shaft to rotate in the forward direction;

a first sub-gear including a main gear engagement portion, which is engaged with the main gear, and a second sub-gear engagement portion, which is formed to have a diameter different from that of the main gear engagement portion, to rotate in the reverse direction;

a second sub-gear including a first sub-gear engagement portion, which is engaged with the second sub-gear engagement portion, and a reverse-rotation gear engagement portion, which is formed to have a diameter different from that of the first sub-gear engagement portion, to rotate in the forward direction; and a reverse-rotation gear which is engaged with the reverse-rotation gear engagement portion to transmit the reverse rotation to the second reverse-rotation coupler and which has a structure coaxial with the main gear shaft.

2. The blender of claim 1, wherein:

a recessed portion is formed in an upper portion of the case so that the case upper plate is disposed at a position lower than an edge of the case; and in the recessed portion which is a space between a bottom portion of the container and the case upper plate, the first main coupler and the second main coupler are connected, and the first reverse-rotation coupler and the second reverse-rotation coupler are connected.

3. The blender of claim 2, wherein a container seating portion, on which a bottom surface of an edge portion of the container is seated, is formed on an edge portion of an upper end of the case.

4. The blender of claim 1, wherein:

in a state in which an inner circumferential surface forming an inner space of the first reverse-rotation coupler is spaced apart from an outer circumferential surface of the first main coupler such that the first reverse-rotation coupler and the first main coupler freely rotate with each other, the first main coupler is disposed in the inner space of the first reverse-rotation coupler; and in a state in which an inner circumferential surface forming an inner space of the second reverse-rotation coupler is spaced apart from an outer circumferential surface of the second main coupler such that the second reverse-rotation coupler and the second main coupler freely rotate with each other, the second main coupler is disposed in the inner space of the second reverse-rotation coupler.

5. The blender of claim 1, wherein:

a through-hole, through which the second main coupler and the second reverse-rotation coupler pass through the case upper plate, is formed in the case upper plate; and an inner flange that protrudes upward from the case upper plate is formed along a circumference of the through-hole.

6. The blender of claim 1, wherein the second main coupler and the second reverse-rotation coupler are separable upward from the case upper plate.

7. The blender of claim 1, wherein:

a first bearing and a third bearing are respectively fitted to an outer circumferential surface of an upper portion of the main blade shaft and an outer circumferential surface of a lower portion of the main blade shaft so that inner rings of the first bearing and the third bearing that come in contact with the outer circumferential surface of the main blade shaft rotate in the forward direction, and outer rings of the first bearing and the third bearing rotate in the reverse direction due to a rotational force transmitted through the reverse-rotation blade shaft; and a second bearing is fitted to the reverse-rotation blade shaft so that an inner ring of the second bearing that comes in contact with an outer circumferential surface of the reverse-rotation blade shaft rotates in the reverse direction.

8. The blender of claim 7, wherein the blade assembly includes:
- a first oil seal configured to prevent oil leakage from the first bearing and permeation of moisture into the first bearing;
- a second oil seal and a third oil seal respectively provided at an upper portion and a lower portion of the second bearing to prevent oil leakage from the second bearing and permeation of moisture into the second bearing; and
- a fourth oil seal configured to prevent oil leakage from the third bearing and permeation of moisture into the third bearing.

9. The blender of claim 1, wherein:
- the blade assembly is provided to pass through a bottom portion of the container and is coupled to be separable from the container; and
- when the case is separated from the container, the gearbox assembly is separated from the blade assembly.

10. The blender of claim 9, wherein:
- a holder body, which includes a holder body body portion through which the main blade shaft and the reverse-rotation blade shaft pass, an annular edge portion that extends outward along a circumference of the holder body body portion, and a support portion that protrudes downward in a cylindrical shape from a bottom surface of the holder body body portion, is provided; and
- the support portion passes through the bottom portion of the container, and a sealing member is provided to maintain airtightness between a bottom surface of the annular edge portion and an upper surface of the bottom portion of the container.

11. The blender of claim 9, wherein:
- a holder body, which includes a holder body body portion through which the main blade shaft and the reverse-rotation blade shaft pass, an annular edge portion that extends outward along a circumference of the holder body body portion, and a cylindrical through-portion that protrudes downward from a bottom surface of the holder body body portion, is provided; and
- a fixing nut that is screw-coupled to an outer circumferential surface of the through-portion to couple the blade assembly to a lower side of the container is provided at the lower side of the container.

12. The blender of claim 1, wherein:
- the first reverse-rotation coupler is integrally formed with the reverse-rotation blade shaft; and
- the first main coupler is coupled to a lower end portion of the main blade shaft by a fastening member.

13. The blender of claim 1, further comprising a first sub-gear shaft that passes through the center of the first sub-gear and stands in a vertical direction and a second sub-gear shaft that passes through the center of the second sub-gear, stands in the vertical direction, and is provided at a position spaced apart toward one side from the first sub-gear shaft.

14. The blender of claim 5,
- wherein a reverse-rotation coupler connecting portion is formed on an upper surface of the second reverse-rotation coupler to transmit the reverse rotation by being engaged with the first reverse-rotation coupler;
- a reverse-rotation coupler edge extending downward from a circumference of an outer edge of the reverse-rotation coupler connecting portion is formed on the second reverse-rotation coupler;
- the reverse-rotation coupler edge and the inner flange are provided to at least partially overlap in the vertical direction at the inner side and outer side.

15. The blender of claim 1, wherein:
- a reverse-rotation gear connection shaft is provided to connect the plurality of gears and the second reverse-rotation coupler to each other to transmit the reverse rotation;
- the main gear shaft passes through an inner portion of the reverse-rotation gear connection shaft so that the second main coupler is coupled to an upper end of the main gear shaft; and
- the second reverse-rotation coupler is coupled to a coupler connecting portion formed on an upper portion of the reverse-rotation gear connection shaft.

16. The blender of claim 1, wherein:
- a step is formed on an outer circumferential surface of the main blade shaft due to a diameter difference of a shaft body; and
- a stepped portion that is caught at the step when the main blade shaft is inserted into the reverse-rotation blade shaft is formed on an inner circumferential surface of the reverse-rotation blade shaft.

17. The blender of claim 1, wherein:
- a step is formed on an outer circumferential surface of the main blade shaft due to a diameter difference of a shaft body; and
- the first main coupler is coupled to a lower end portion of the main blade shaft, when a main blade shaft coupling groove of the first main coupler is inserted into a coupler coupling portion of the main blade shaft, an upper surface of a main blade shaft coupling portion surrounding the main blade shaft coupling groove is caught at the step.

* * * * *